(12) United States Patent
Young (10) Patent No.: US 8,341,186 B2
(45) Date of Patent: Dec. 25, 2012

(54) SMART ENERGY NETWORK CONFIGURATION USING LINK KEY DATABASE

(75) Inventor: Joel K. Young, Eden Prairie, MN (US)

(73) Assignee: Digi International Inc., Minnetonka, MN (US)

( * ) Notice: Subject to any disclaimer, the term of this patent is extended or adjusted under 35 U.S.C. 154(b) by 159 days.

(21) Appl. No.: 12/792,814

(22) Filed: Jun. 3, 2010

(65) Prior Publication Data

US 2011/0302190 A1 Dec. 8, 2011

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| | | | |
|---|---|---|---|
| 7,486,648 | B1 | 2/2009 | Baranowski |
| 2002/0188845 | A1* | 12/2002 | Henderson et al. ........... 713/168 |
| 2004/0212500 | A1 | 10/2004 | Stilp |
| 2004/0235468 | A1 | 11/2004 | Luebke et al. |
| 2005/0271128 | A1 | 12/2005 | Williams et al. |
| 2007/0197262 | A1 | 8/2007 | Smith et al. |

* cited by examiner

*Primary Examiner* — Isaac M Woo
(74) *Attorney, Agent, or Firm* — Schwegman Lundberg & Woessner, P.A.

(57) ABSTRACT

Various embodiments include a method and system for configuring a smart energy network using a link key database. An energy services interface, on the smart energy network, extracts a unique identifier associated with a smart energy device from a communication with the smart energy device. The energy services interface may then use the unique identifier to receive information associated with the smart energy device from the link key database.

10 Claims, 5 Drawing Sheets

SMART ENERGY NETWORK CONFIGURATION USING LINK KEY DATABASE

TECHNICAL FIELD

This document pertains generally to utility monitoring devices, and more particularly, but not by way of limitation, to smart energy network configuration using a link key database.

BACKGROUND

Smart energy ("SE") devices and networks have been deployed in homes and businesses as utilities and consumers attempt to better understand and control energy use. SE networks are typically a collection of monitoring, control, and reporting devices located, for example, in a home. Typical SE devices include, for example, thermostats and water, gas, and electric meters. The SE devices generally implement one or more communications protocols to communicate with each other and ultimately the utility or consumer.

In order to safeguard utilities from incidental or malicious interference from SE networks, SE networks and SE devices are secured using various methods. One such method is to encrypt communications between the SE devices on a SE network. Typically, SE devices are preconfigured, by the manufacturer, with a symmetric cipher key, called a link key, to encrypt the SE device's communications until another key used by the SE network, often called a NetKey, can be given to the SE device after it joins the SE network.

A smart energy device joins the smart energy network through an energy services interface ("ESI"), which may also be known as an energy services portal ("ESP"), the ESI also communicating with a utilities' automated metering infrastructure ("AMI") network. In order for the ESI to join a SE device to the SE network, the ESI needs to be configured to identify the SE device and, at least, with the SE device's link key. Typically this process is done by a human installer of the SE device. The installer may determine the SE device's information from the product packaging. The installer may then connect to the AMI network and input the SE device information for the given SE network which is typically identified by an ESI for the SE network. Typically, the AMI network may then push the SE device information down to the ESI. Then the installer activates the SE device which then begins the joining process. For drivers specific to the SE device, the installer may also need to load these to the ESI in a manner similar to configuring the link key. This cumbersome process is then repeated for each SE device added to the SE network.

OVERVIEW

In systems having an ESI coupled to a SE device and a link key database, it can be advantageous for the ESI to use the link key database to obtain the SE device information with minimal intervention by the human installer. By extracting a unique identifier for the SE device from a SE device communication, the ESI may then lookup the SE device's link key, or other SE device information, from the link key database and thus ease the burden on the human installer of the SE device. This document provides numerous examples in the detailed description, an overview of which is provided here.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In order to join and utilize smart energy ("SE") devices attached to a SE network, an energy services interface ("ESI") may require information about the SE device. Alternatively, if an energy services portal ("ESP") is used instead of, or in addition to, an ESI, the ESP may also require the SE device information. However, for the purposes described herein, an ESP is equivalent to an ESI and so only ESIs will be discussed even though the material is equally applicable to ESPs.

It can be advantageous to store the SE device information in a link key database and associate the information with a unique identifier for the SE device. Additionally, permitting the ESI to extract the unique identifier from a communication with the SE device, whether or not the communication is encrypted, may allow the ESI to automatically identify and retrieve the SE device information from the link key database. Once the information is had, which may, for example, include a link key, driver, or other information for the SE device, the ESI may be able to decrypt SE device communications and join the SE device to the SE network, or support extended features of the SE device through a driver which may also be known as manufacturer specific profile ("MSP") extensions. In some examples the link key database may be pre-populated with information from the SE device manufacturer and the human installer's participation is limited to physically installing the SE device and activating it, obviating the need for the previously cumbersome process of manually inputting information for each SE device added to the SE network.

Figure 1:
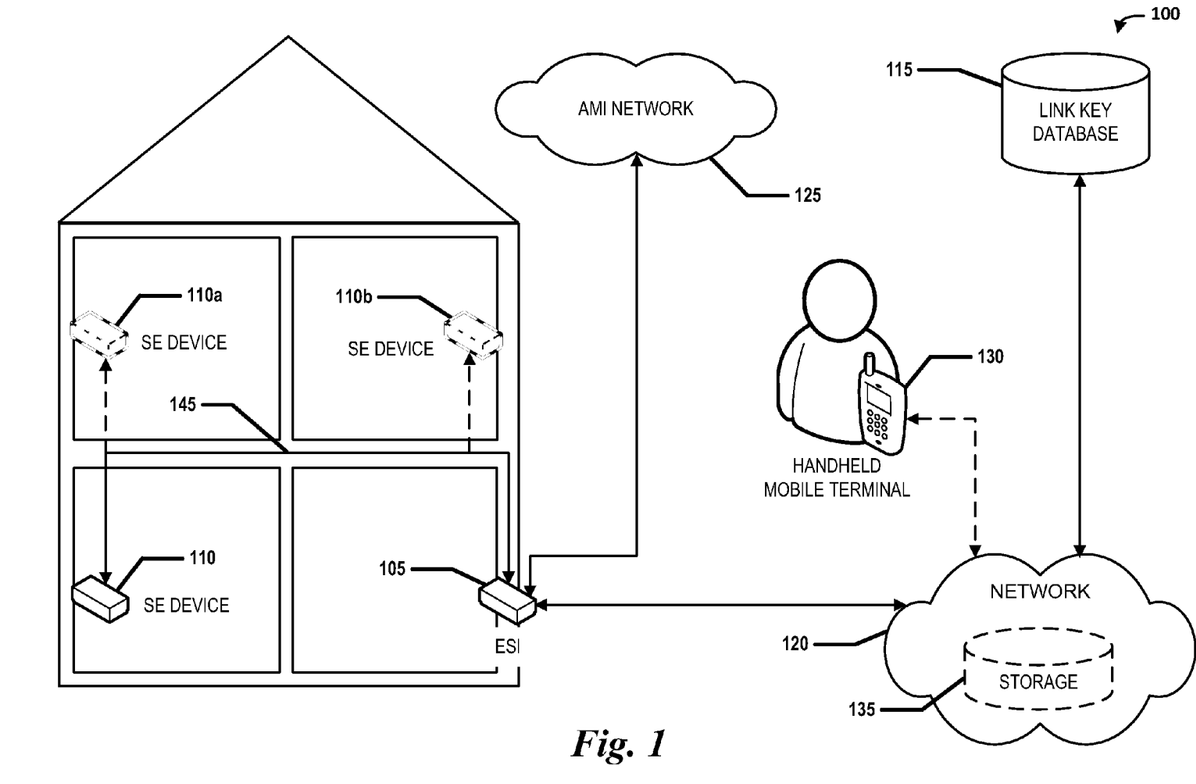
FIG. 1 illustrates an example system to configure a smart energy network using a link key database.

FIG. 1 illustrates an example system 100 that configures a smart energy ("SE") network using a link key database. An energy services interface ("ESI") 105 is coupled to a SE device 110, to a link key database 115 through network 120, and to an automated monitoring infrastructure ("AMI") network 125. In one embodiment, network 120 and AMI network 125 may include some of the same network infrastructure. An SE network 145 may be comprised of the ESI 105, SE device 110 and possibly more SE devices or SE network components, such as SE device 110a and SE device 110b.

The SE device 110 may have a link key configured by its manufacturer. Upon activation by a human installer, the SE device 110 may attempt to join the SE network 145 through the ESI 105 using its link key to encrypt the communication. In various embodiments the SE device 110 may be connected to other SE devices and one or more ESIs 105 by, for example, a wireless or wired network. The SE network 145 may be a traditional hub and spoke network or a mesh network. In various embodiments a portion of the encrypted communication may be unencrypted, such as the packet or frame headers at various levels in the communication stack. In various embodiments the unencrypted portion of the communication may contain a unique identifier for the SE device 110, such as, for example, a media access control ("MAC") address for the SE device 110. In various embodiments the SE device 110 may be one among many SE devices on the SE network 145. In various embodiments the SE device 110 may be, for example, a thermostat or a gas, water, or an electric meter. It will be understood that the SE device 110 may be any number of device types used to support the monitoring and control of resource utilization by a SE network 145.

The ESI 105 may mediate between the SE network 145 and external entities, such as the AMI network 125 for a utility. In various embodiments the ESI 105 may connect to the AMI network 125 through various mechanisms including, but not limited to, wired and wireless connections using proprietary communications protocols for a utility, or through other communications protocols such as, for example, various cellular network protocols.

The ESI 105 may receive a communication from the SE device 110 to join the SE network 145. The ESI 105 may be configured to extract the unique identifier for the SE device 110 from the communication. When the communication is encrypted, the ESI 105 may be able to extract the unique identifier from an unencrypted portion of the communication. The ESI 105 may then communicate the unique identifier to the link key database 115. In various embodiments the ESI 105 couples with the link key database 115 through network 120. In various embodiments the ESI 105 may connect to network 120 or the link key database 115 through a wired or wireless network.

In various embodiments the ESI 105 may be a stand-alone device. In other embodiments the ESI 105 may be integrated into a SE device 110, such as a meter. In still other embodiments, the ESI 105 may be integrated with another device on the SE network 145, such as, for example, a network gateway.

The link key database 115 may be pre-configured with information about the SE device 110. In various embodiments the SE device 110 information is mapped to the unique identifier for the SE device 110. In various embodiments the SE device 110 information may be added to the link key database 115 at any time. The link key database 115 may be any type of database capable of storing an association between the unique identifier and link key or other information for a SE device 110, including, for example, a relational database management system ("RDBMS"), a hierarchical database system, or a file system.

Network 120 may include storage 135 to store the association. In various embodiments the storage 135 may be any type of storage capable of storing an association between a unique identifier and street address for the ESI 105, including, for example, a RDBMS, a hierarchical database system, or a file system. In some embodiments the storage 135 may be the link key database 115. Associating the unique identifier with the street address may facilitate the ESI's 105 connection to the link key database 115 through network 120. In various embodiments the unique identifier for the ESI 105 may be a MAC address of the ESI 105. In various embodiments the ESI's 105 unique identifier may be extracted from an ESI 105 communication to the network 120.

System 100 may optionally include a handheld mobile terminal 130, such as a smart phone, that may connect to network 120 and associate a unique identifier for the ESI 105 with a street address for the SE network 145. In various embodiments the handheld mobile terminal 130 may communicate a user interface which accepts both the street address and the unique identifier from an operator, such as, for example, the human installer of the SE network 145. In other embodiments either, or both, the street address or the unique identifier may be determined automatically, such as, for example, using the global positioning system ("GPS") in conjunction with map software to automatically determine the street address of the ESI 105. In various embodiments the handheld mobile terminal 130 may connect to network 120 through wired or wireless networks, such as, for example, a cellular network or the internet.

Figure 2A:
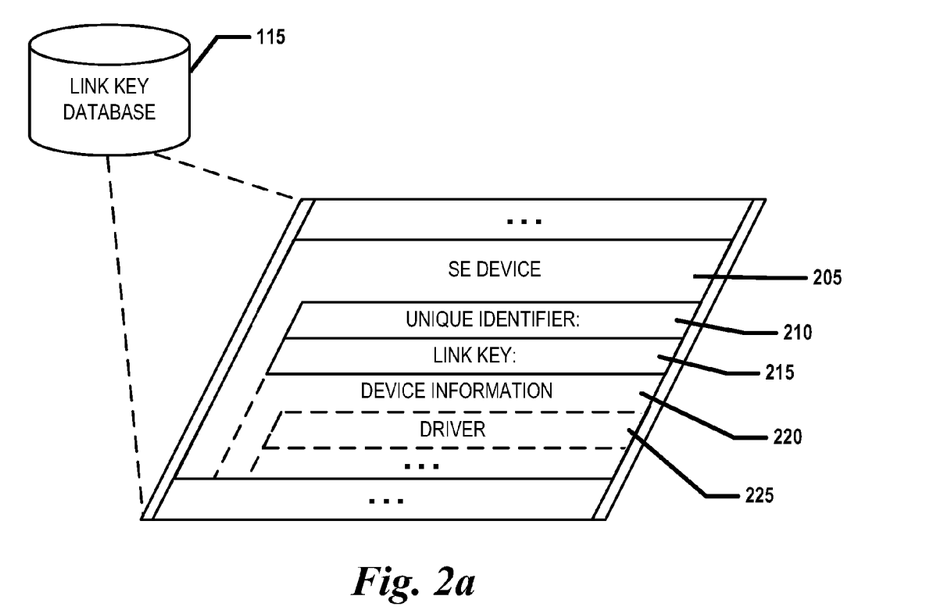
FIG. 2a illustrates a block diagram of link key database contents for a given smart energy device.

FIG. 2a illustrates a block diagram of the link key database 115 contents for a given smart energy device. The diagram logically illustrates the collection of SE device information 205 stored by the link key database 115 for a given SE device 110 and is not necessarily representative of the actual format used to store the information. For example, if the link key database 115 is a RDBMS, one table may store the unique identifier 210 and link key 215 while one or more other tables store other device information 220, such as a driver 225 for the SE device 110.

SE device information 205 may include the unique identifier 210 and the link key 215 for a SE device 110, i.e., the link key 215 may be mapped to the unique identifier 210. In other embodiments, the SE device information 205 may include additional device information 220 mapped to the unique identifier 210. In some embodiments the additional device information 220 may include a driver 225 for the SE device 110, where the driver 225 may be known as manufacturer specific profile ("MSP") extensions for the SE device 110.

Figure 2B:
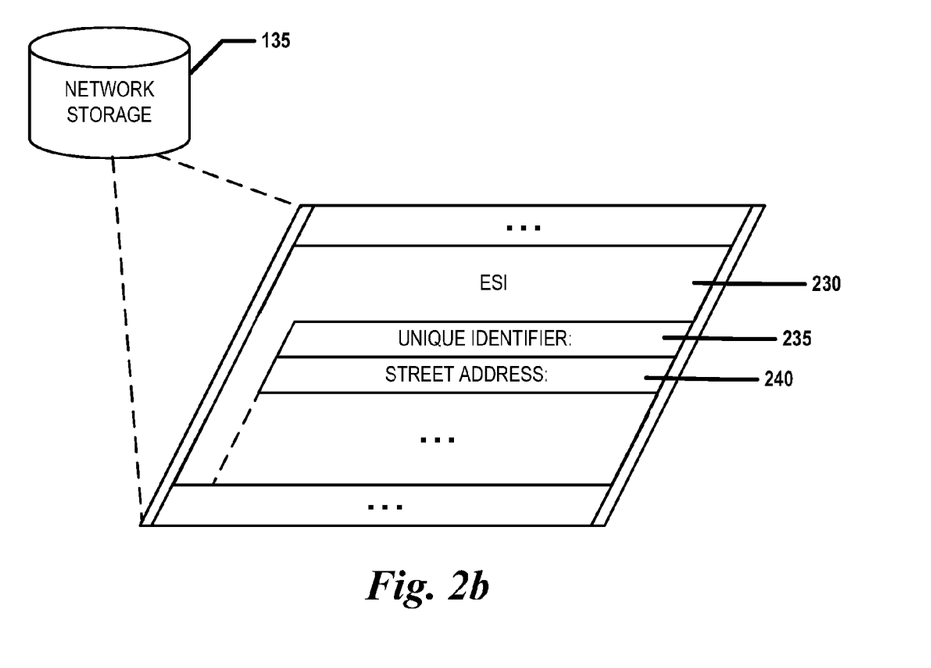
FIG. 2b illustrates a block diagram of network storage contents for an energy services portal.

FIG. 2b illustrates a block diagram of the network storage 135 contents for an energy services portal. The diagram logically illustrates the association of ESI information 230 stored by network storage 135 for a given ESI 105 and is not necessarily representative of the actual format used to store the information. For example, if network storage 135 is implemented as a file system, a directory may be named the same as the unique identifier 235 and the directory's contents may include the street address 240. In various embodiments additional information about the ESI 105 may be kept in network storage 135. In various embodiments the network storage 135 may be the link key database 115 or stored within the link key database 115.

Figure 3:
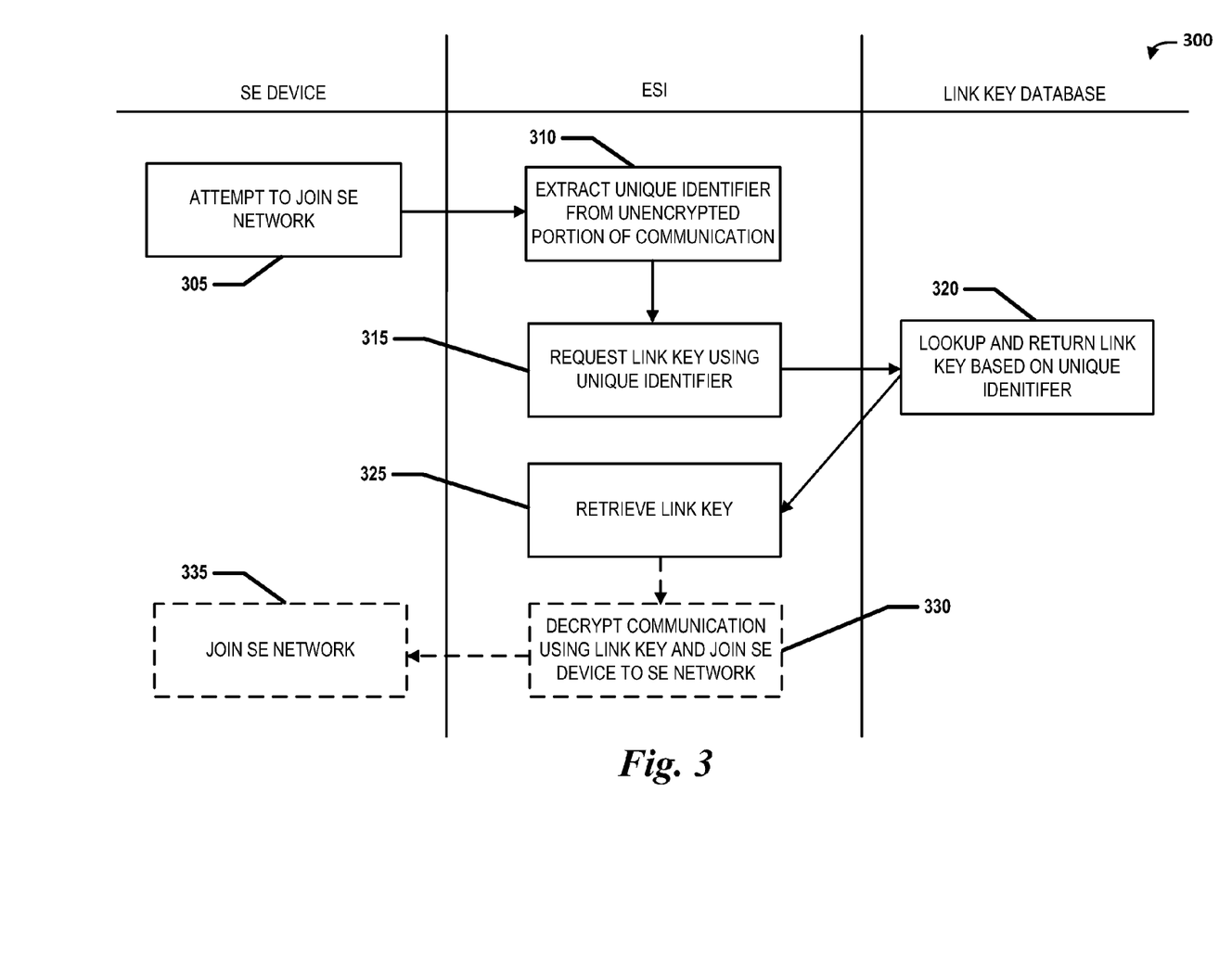
FIG. 3 illustrates a swim-lane flowchart for an example method to configure a smart energy network using a link key database.

FIG. 3 illustrates a swim-lane flowchart for an example method 300 to configure a smart energy network using a link key database. Various components from system 100, shown in FIG. 1, may be used to implement the method 300 and components from system 100 are used here for illustrative purposes.

At 305 a SE device 110 attempts to join a SE network 145. In various embodiments the SE device 110 may broadcast a beacon, or employ another method of the underlying network infrastructure supporting the SE device's 110 connectivity to the SE network 145. In various embodiments the communication may be encrypted using the SE device's 110 link key 215. In various embodiments the encrypted communication is partially unencrypted, such as, for example, the packet headers of one or more underlying network protocols. In various embodiments the unencrypted portion of the communication contains a unique identifier 210 for the SE device 110, such as, for example, a MAC address for the SE device 110.

At 310 the ESI 105, having received the communication from the SE device 110 to join the SE network 145, extracts the SE Device's 110 unique identifier 210 from an unencrypted portion of the communication.

At 315 the ESI 105 may request the link key 215 for the SE device 110 from the link key database 115 using the unique identifier 210. In various embodiments the ESI 105 may query the link key database 115 using, for example, structure query language ("SQL") statements, or may use other interfaces, such as a web services interface, to interact with the link key database 115.

At 320 the link key database 115 retrieves the link key 215 that maps to the unique identifier 210. The link key database 115 may then return the link key 215 to the ESI 105.

At 325 the ESI 105 receives the link key 215. The ESI 105 may then store the unique identifier 210 and the link key 215 in order to facilitate future communications with the SE device 110.

At 330 the ESI 105, in some embodiments, may use the link key 215 to decrypt the SE device 110 communication to join the SE network 145. In various embodiments the ESI 105 may provide the SE device 110 with a NetKey to encrypt future communications.

At 335 the SE device 110 completes the SE network 145 joining process. In various embodiments the SE device 110 exchanges certificates with the ESI 105 to complete the joining process.

Method 300 may be repeated for each SE device 110 attached to the SE network 145 at any time. For example, if a home had four SE devices installed initially, a thermostat, a water meter, a gas meter, and an electricity meter, each SE device, once activated, may be joined to the SE network 145 by the ESI 105 without further intervention by the human installer. Additionally, if, for example, the thermostat was not installed initially, it may be added at a later date and join the SE network 145 in the same manner described above without additional work by the human installer.

Figure 4:
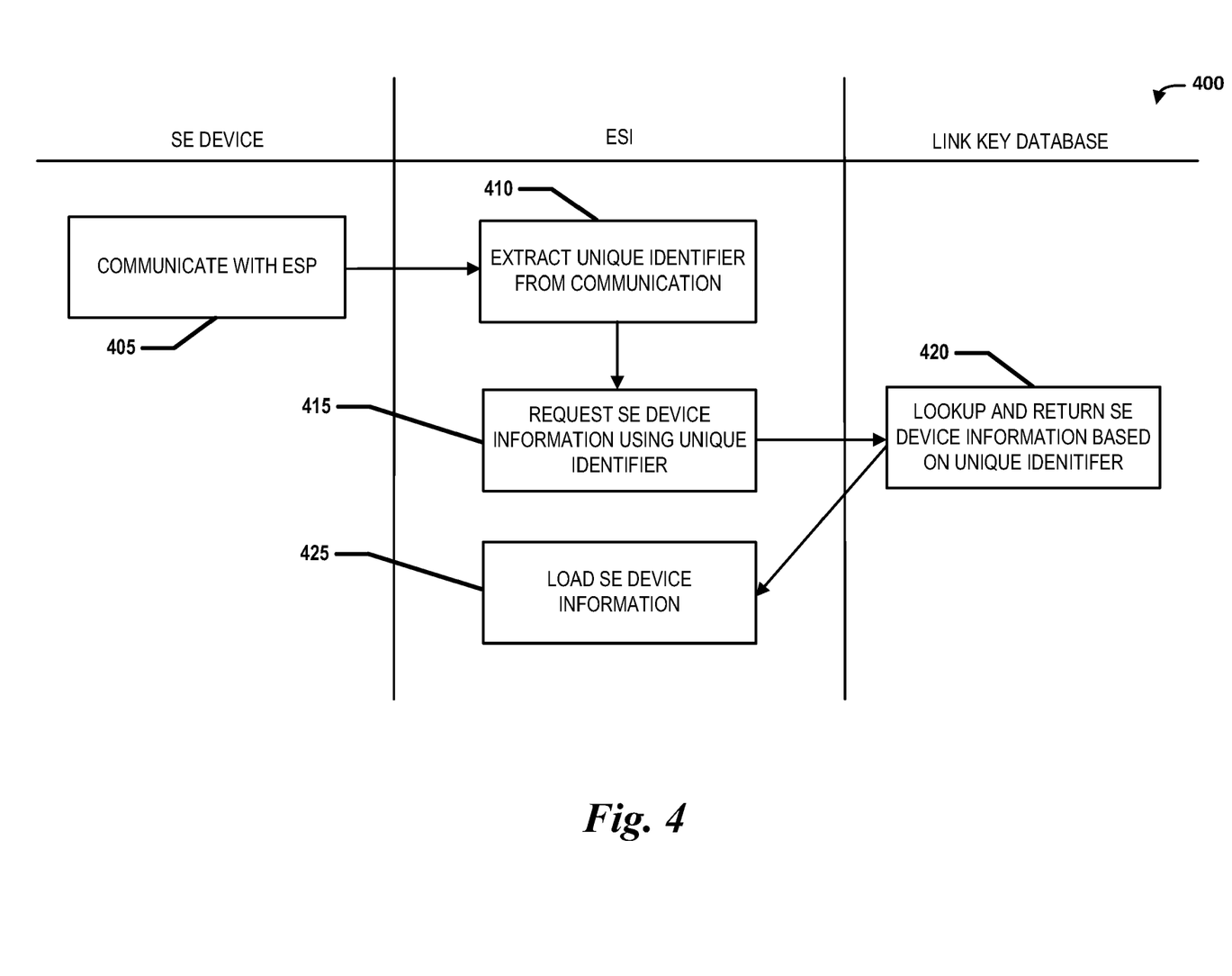
FIG. 4 illustrates a swim-lane flowchart for an example method to configure a smart energy network using a link key database to load information about a smart energy device onto an energy services portal.

FIG. 4 illustrates a swim-lane flowchart for an example method 400 to configure a smart energy network using a link key database to load information about the smart energy device onto the energy services portal. Various components from system 100, shown in FIG. 1, may be used to implement the method 400 and components from system 100 are used here for illustrative purposes.

At 405 the SE device 110 may communicate with an ESI 105. In some embodiments the communication may be part of the SE device's 110 attempt to join a SE network 145. In other embodiments, the communication may be subsequent to the joining of the SE device 110 to the SE network 145. In various embodiments the communication may be encrypted. In other embodiments the communication may be unencrypted.

At 410 the ESI 105 may extract a unique identifier 210 for the SE device 110 from the communication. In various embodiments the ESI 105 may be able to extract the unique identifier 210 from an unencrypted portion of an encrypted communication that the ESI 105 can't decrypt. In other embodiments, the ESI 105 may extract the unique identifier 210 from any portion of the communication if the communication is unencrypted or the ESI 105 can decrypt the communication.

At 415 the ESI 105 may request SE device information 205 for the SE device 110. In various embodiments the SE device information 205 may include the link key 215 for the SE device 110. In various embodiments the SE device information 205 may include device information 220 in addition to the link key 215. In various embodiments the device information 220 may include a driver, or MSP, of the SE device 110. In various embodiments the ESI 105 may request only a portion of the SE device information 205.

At 420 the link key database 115 may retrieve all, or a portion of, the SE device information 205 that maps to the SE device's 110 unique identifier 210 and return it to the ESI 105.

At 425 the ESI 105 may receive and load the SE device information 205 returned by the link key database 115. In various embodiments the ESI 105 may load and use the SE device information 205. For example, if the returned SE device information 205 is a driver for the SE device 110, the ESI 105 may load the driver and use it to utilize MSP extensions of the SE device 110 to achieve greater functionality than may be possible with a standard SE device of a given type.

Figure 5:
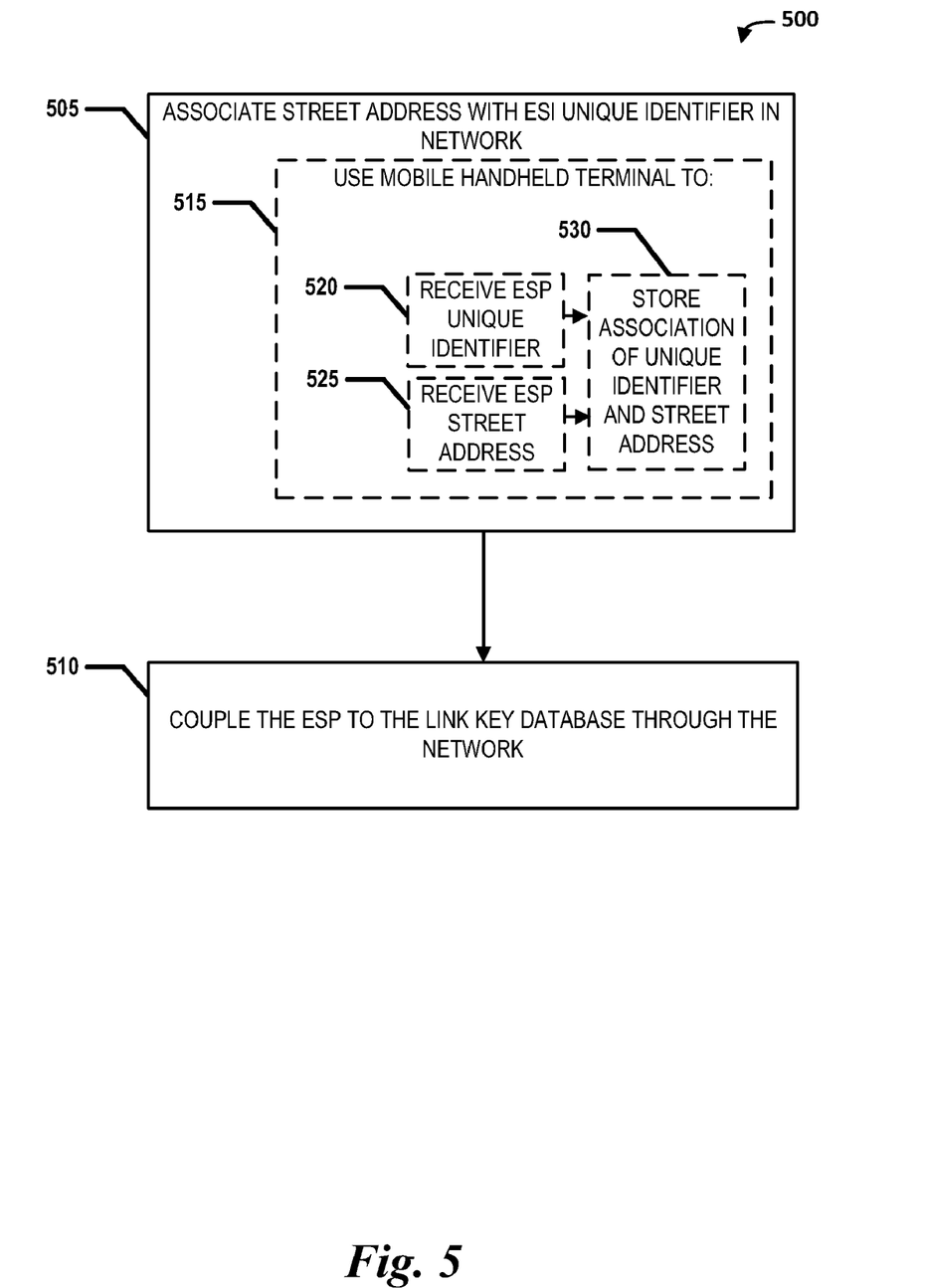
FIG. 5 illustrates a flowchart for an example method of configuring an energy services portal on the network to allow the energy services portal to couple to the link key database.

FIG. 5 illustrates a flowchart for an example method 500 of configuring an ESI on the network to allow the ESI to couple to a link key database. Various components from system 100, shown in FIG. 1, may be used to implement the method 500 and components from system 100 are used here for illustrative purposes.

At 505 the street address 240 of the SE network 145 may be associated with a unique identifier 235 for the ESI 105 in network 120. In various embodiments the association may be stored in network storage 135 within network 120. In other embodiments the association may be stored in the link key database 115. In various embodiments the unique identifier 235 may be any information by which to differentiate the ESI 105 from another ESI that is part of an ESI 105 communication, such as, for example, the ESI's 105 MAC address.

At 510 network 120 may couple the ESI 105 to the link key database 115 after the association of 505 is complete. In various embodiments network 120 may extract the unique identifier 235 from an ESI 105 communication and ascertain the street address 240 of the SE network 145 by querying the network storage 135. In various embodiments network 120 may extract the unique identifier from an unencrypted portion of the ESI's 105 communication if the communication is encrypted.

At 515 a mobile handheld terminal 130 may be used to connect to network 120 and associate the street address 240 with the unique identifier 235 for the ESI 105. For example, a human installer of the SE network 145—or more specifically, the ESI 105—may utilize the handheld mobile terminal 130 during the installation and setup.

At 520 the handheld mobile terminal 130 may receive the unique identifier 235 of the ESI 105. In various embodiments the handheld mobile terminal 130 may communicate a user interface to an operator to accept the unique identifier 235. In various embodiments the handheld mobile terminal 130 may assist the operator in entering the unique identifier 235. For example, if the handheld mobile terminal 130 is a smart phone with a camera and the unique identifier 235 is visible on the ESI 150 packaging, the operator may take a picture of the unique identifier 235 in order to enter it into the user interface.

At 525 the handheld mobile terminal 130 may receive the street address 240 of the ESI 105. In various embodiments the handheld mobile terminal 130 may communicate a user interface to the operator to accept the street address 240. In other embodiments the handheld mobile terminal 130 may attempt to automatically ascertain the street address 240. For example, the handheld mobile terminal 130 may use GPS, possibly in connection with mapping software, to automatically determine the street address 240 when the operator is physically present at the SE network 145 site. In various embodiments the handheld mobile terminal 130 may assist the operator in entering the street address 240 using an attempt to automatically ascertain the street address 240. For example, the communicated user interface may provide a list of street addresses that the operator may choose from.

At 530, after the unique identifier 235 and street address 240 have been received by the handheld mobile terminal 130, the handheld mobile terminal 130 may store the association of the unique identifier 235 and the street address 240 for the ESI 105 in network 120. In various embodiments the handheld mobile terminal 130 may connect to network 120 and store the association in network storage 135.

The burden on those installing SE networks may be reduced by using an ESI that can connect to the link key database and determine configuration parameters, such as SE device link keys and drivers, for the SE network. The installer is relieved from manual entry of probably long and cryptic information for each SE device attached to the SE network. Additionally, using the handheld mobile terminal may ease the installer's burden further by bringing greater functionality, portability, and ease in configuring the ESI to utilize the link key database.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
    a network device, the network device having a link key;
    a storage device including a database, wherein the database includes a plurality of link keys; and
    a network portal coupled to the network device and the database, the network portal configured to:
        extract a key value from an unencrypted portion of an encrypted network device communication to join a network;
        retrieve the link key from the link key database using the key value, wherein the link key is used to both encrypt and decrypt the encrypted network device communication;
        extract a unique identifier from a communication with the network device; and
    load a portion of information associated with the network device from the database using the unique identifier, wherein the portion of information includes a driver for the network device.

2. The system of claim 1, wherein the key value is the media access control (MAC) address of the network device.

3. The system of claim 1, wherein the network portal is further configured to decrypt the encrypted network device communication using the link key and join the network device to the network.

4. A system comprising:
    a storage device including a database, wherein the database includes a plurality of link keys;
    a network portal coupled to the database and capable of communicating with a network device having a link key, the network portal configured to:

extract a key value from an unencrypted portion of an encrypted network device communication to join a network;

retrieve the link key from the link key database using the key value, wherein the link key is used to both encrypt and decrypt the encrypted network device communication;

extract a unique identifier from a communication with the network device; and load a portion of information associated with the network device from the database using the unique identifier, wherein the portion of information includes a driver for the network device.

5. The system of claim 4, wherein the key value is the media access control (MAC) address of the network device.

6. The system of claim 4, wherein the network portal is further configured to decrypt the encrypted network device communication using the link key and join the network device to the network.

7. A system comprising:

a network device having a link key a storage device including a database, the database configured to map a key value to the link key;

a network portal coupled to the network device and the database, the network portal configured to:

extract the key value from an unencrypted portion of an encrypted network device communication to join a network;

retrieve the link key from the database using the key value, wherein the link key is used to both decrypt and encrypt the encrypted network device communication;

extract a unique identifier from a communication with the network device; and load a portion of information associated with the network device from the database using the unique identifier, wherein the portion of information includes a driver for the network device;

a network communicatively coupled to the storage device and the network portal; and a device capable of communicating with the storage device over the network, wherein the network is configured to associate a street address with a unique identifier associated with the network portal to allow the network portal communicate with the database through the network.

8. A method comprising:

storing, a plurality of link keys using a database;

providing network portal capable of communicating with the SE a network device having a link key;

coupling the network portal to the database; and configuring the network portal to:

extract a key value from an unencrypted portion of an encrypted network device communication to join a network;

retrieve the link key from the database using the key value, wherein the link key is used to both encrypt and decrypt the encrypted network device communication;

extract a unique identifier from a communication with the network device; and load a portion of information associated with the network device from the database using the unique identifier, wherein the portion of information includes a driver for the network device.

9. The method of claim 8, wherein the key value is the media access control (MAC) address of the network device.

10. The method of claim 8, wherein the method further comprises:

decrypting, using the network portal and the link key, the encrypted network device communication; and joining the network device to the network.

* * * * *

UNITED STATES PATENT AND TRADEMARK OFFICE
CERTIFICATE OF CORRECTION

PATENT NO. : 8,341,186 B2
APPLICATION NO. : 12/792814
DATED : December 25, 2012
INVENTOR(S) : Young Page 1 of 1

It is certified that error appears in the above-identified patent and that said Letters Patent is hereby corrected as shown below:

In the Claims:

At Claim 4, Column 9, Line 4, replace "the link key database" with --the database--.
At Claim 8, Column 10, Line 13-14, replace "with the SE a network device" with --with a network device--.

Signed and Sealed this
Fourteenth Day of May, 2013

Teresa Stanek Rea
*Acting Director of the United States Patent and Trademark Office*